United States Patent [19]

Beery

[11] 4,087,173

[45] May 2, 1978

[54] DOCUMENT PHOTOGRAPHY SYSTEM

[75] Inventor: Jack Beery, Farmington, Mich.

[73] Assignee: Burroughs Corporation, Detroit, Mich.

[21] Appl. No.: 723,361

[22] Filed: Sep. 15, 1976

[51] Int. Cl.² .............................................. G03B 27/32
[52] U.S. Cl. ........................................ 355/24; 355/77; 355/51; 355/65
[58] Field of Search ..................................... 355/23–26, 355/11, 8, 64, 65, 66, 50, 51, 77

[56] References Cited

U.S. PATENT DOCUMENTS

| | | | |
|---|---|---|---|
| 3,592,542 | 7/1971 | Kaufer et al. | 355/51 |
| 3,885,871 | 5/1975 | Galatha et al. | 355/24 |
| 3,981,580 | 9/1976 | Yamashita | 355/24 |

Primary Examiner—L. T. Hix
Assistant Examiner—W. J. Brady
Attorney, Agent, or Firm—David R. Syrowik; Robert C. J. Tuttle; Carl Fissell, Jr.

[57] ABSTRACT

A document photography system photographs the obverse and reverse faces of a moving document by tracking the document with a moving lens. The motion of the lens is in timed relation to the velocity of the document and in dimensional relation to the reduction of the lens. The lens is supported in a flexural mounting which allows the lens to be displaced upon the application of motive power. Motive power is provided by a rotational motor which has its output translated to rectilinear motion by mechanical linkage. The motor output is fed back by an optical tachometer to a phase-locked servo system to maintain uniform, linear lens motion.

25 Claims, 9 Drawing Figures

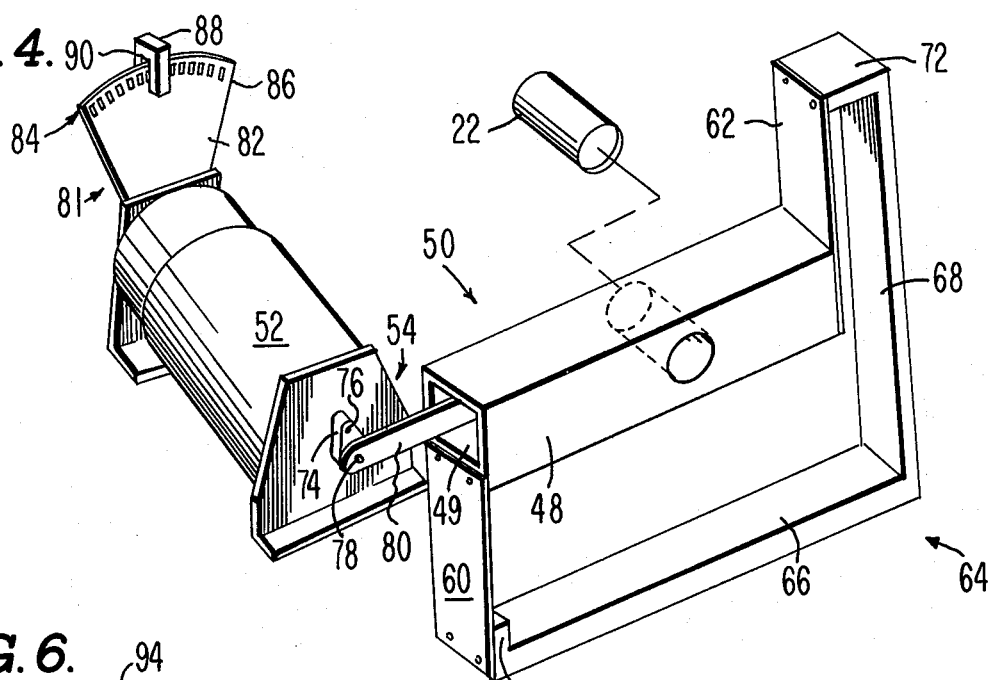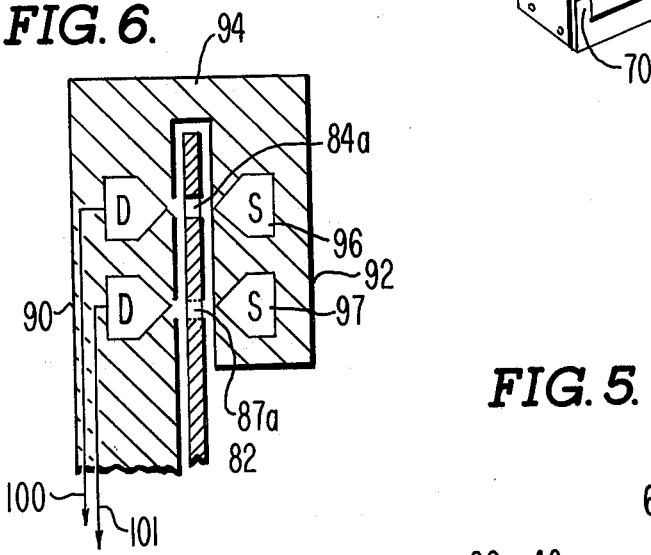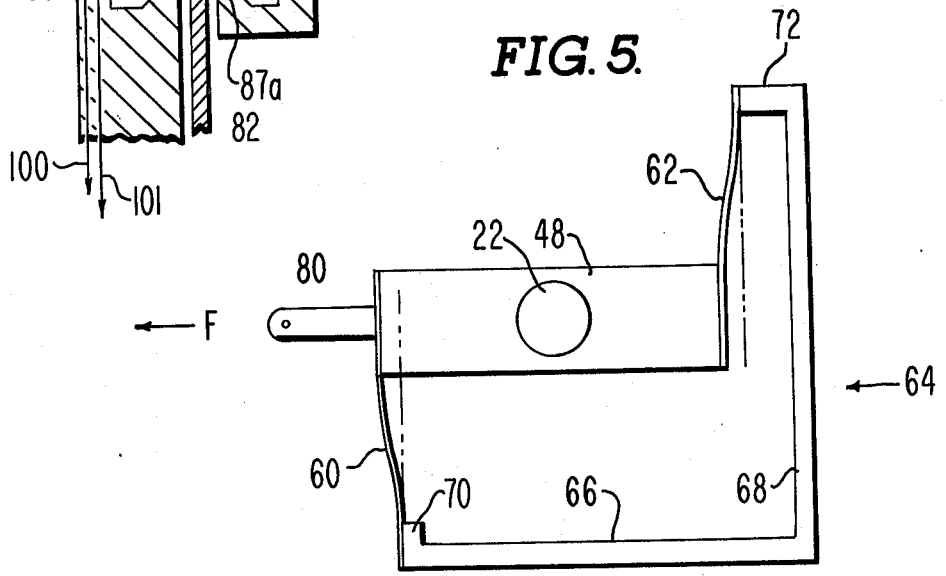

DOCUMENT PHOTOGRAPHY SYSTEM

INTRODUCTION

This invention relates to document photography systems and more particularly to a system for recording the document image on microfilm or similar type media.

DESCRIPTION OF THE PRIOR ART

The art of document photography systems has advanced to the point where documents moving at high speed may have their obverse and reverse images captured and recorded at a reduced dimension on a recording medium such as microfilm or the like. Such a system is evidenced by the patent to Galatha et al, U.S. Pat. No. 3,885,871. The Galatha et al device, however, employs a highly sophisticated optical system requiring simultaneous and proportionate adjustment of mirrors to accomodate sequential documents of differing widths. Other prior art devices are limited by their complexity in mechanical or optical design affecting speed and efficiency.

The identifiable limitations of the prior art point to a need for a document photography system capable of recording both the obverse and reverse images of a document at high speed with a relatively simple and economical mechanical and optical design. A document photography system meeting these criteria is a principal objective of the present invention.

BRIEF DESCRIPTION OF THE INVENTION

The present invention is a document photography system which uses a moving lens to track the obverse and reverse images of a moving document. The lens is caused to move in proportionate relationship to both the velocity of the document and the reduction ratio of the lens. The mirror array which transfers the document images to the lens is fixed. The recording film is held stationary while each document is being photographed and advanced only between succeeding documents.

In the preferred form of the invention the lens is mounted in a flexural assembly. The lens is displaced when the flexural members of the assembly are driven by a motive force. The motive force is controlled in accordance with a proportionate relationship to the document velocity and the lens reduction ratio. In the disclosed embodiment the motive force is provided by a motor whose rotational output is translated into rectilinear motion of the lens by mechanical linkage. A phase-locked, servo loop is employed to regulate the output of the motor.

Additional advantages and features of the present inventive design will be appreciated by reference to the following detailed description of a specific embodiment.

BRIEF DESCRIPTION OF THE DRAWING

FIG. 4 is a perspective view of the lens actuating system represented by FIG. 3, exclusive of the actuator logic circuit;

FIG. 5 is a front elevational view of the flexural lens mounting of FIG. 4 shown in a stressed condition;

FIG. 6 is a section view of the sensing head of the optical tachometer shown in FIG. 4;

DETAILED DESCRIPTION OF A SPECIFIC EMBODIMENT

Figure 1:
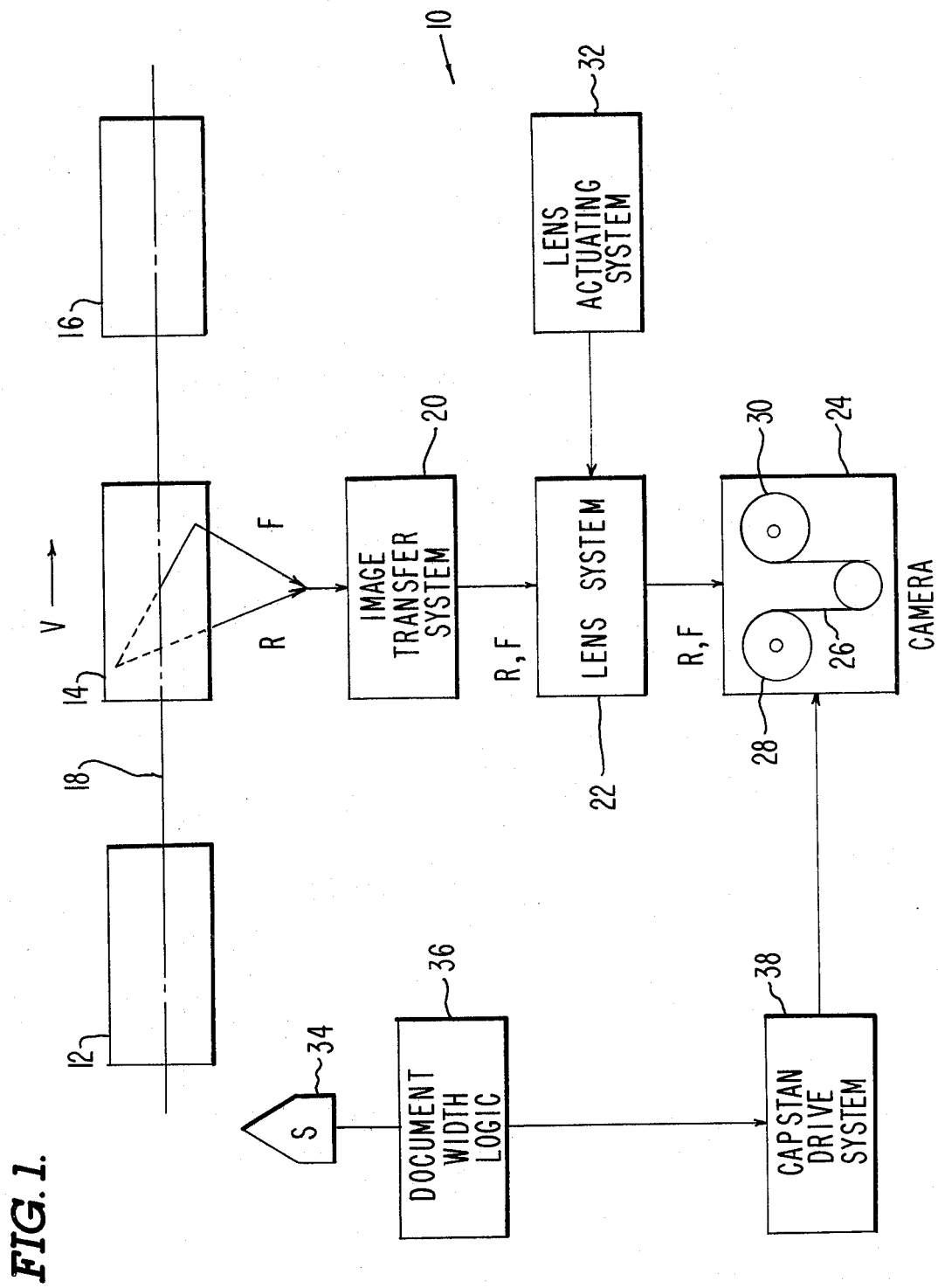
FIG. 1 is an overall, block diagram representation of the document photography system of the present invention.

With reference to FIG. 1, a document photography system formed in accordance with the present invention is shown generally at 10. Documents whose obverse and reverse (or front and rear) faces are to be photographically recorded are identified as 12, 14 and 16. The documents traverse a transport track, symbolically represented by centerline 18, at a predetermined velocity V.

The front and rear images of the document 14 are optically received by an image transfer system 20 whose specifics will be hereinafter more fully presented. The front and rear images are transferred from system 20 to a lens system 22. The function of lens system 22 is to optically reduce the scale of the document images from a first dimension to a second dimension suitable for recording on film or like media. In microfilming applications, a lens reduction ratio on the order of 50:1 is conventional.

The reduced document images from the lens system 22 are received by a camera 24 wherein they are captured on film 26. The film is supplied from a feed reel 28 to a take-up reel 30 as is conventional in the camera art.

During the photographing of each document, the film 26 is held stationary. Instead of moving the film, the lens system 22 is moved in a tracking relationship with the moving document. The lens system 22 is actuated by a lens actuating system 32 which will be hereinafter described in greater detail.

As each succeeding document is photographed, the film 26 in the camera 24 is advanced by a capstan drive system 38. The amount of film advance is a function of the width of the incoming document 12. A sensor 34 is used to sense document width. The signal from the sensor 34 is input to a document width logic circuit 36 which drives the capstan drive system 38. A film advance system of this type is taught in Galatha et al, U.S. Pat. No. 3,885,871, which is hereby incorporated by reference.

Figure 2:
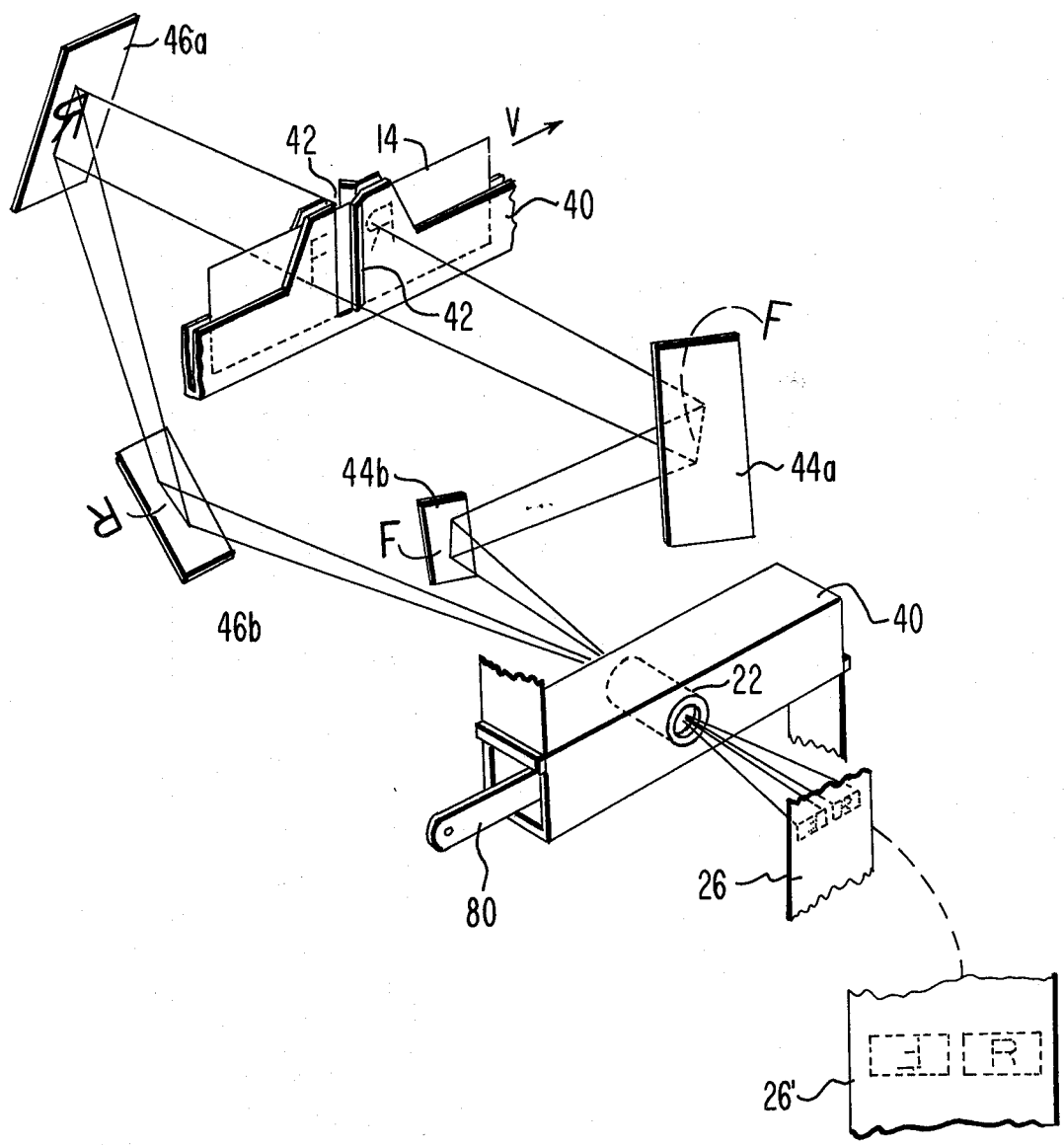
FIG. 2 is a perspective view of the image transfer system and lens system of FIG. 1 detached from the rest of the overall system.

FIG. 2 illustrates a practical embodiment of the image transfer system 20 and lens system 22 discussed in connection with FIG. 1. As document 14 traverses a viewing station 40 in the transport track it passes an imaging slit 42. The imaging slit 42 exposes a portion of the front and rear faces of the document 14 to front and rear imaging mirrors 44a and 46a. Images are reflected off mirrors 44a and 46a to imaging mirrors 44b and 46b, respectively. The function of mirrors 44a, b and 46a, b (which collectively represent image transfer system 20) is to redirect and reorient the optical images for receipt by the lens system 22. The lens system 22 reduces the optical images and transmits them onto film 26. The front and rear images are recorded as they appear in the enlarged representation of the film 26. The apparatus which supports the lens system 22 in FIG. 2 will be described in detail subsequently.

Figure 3:
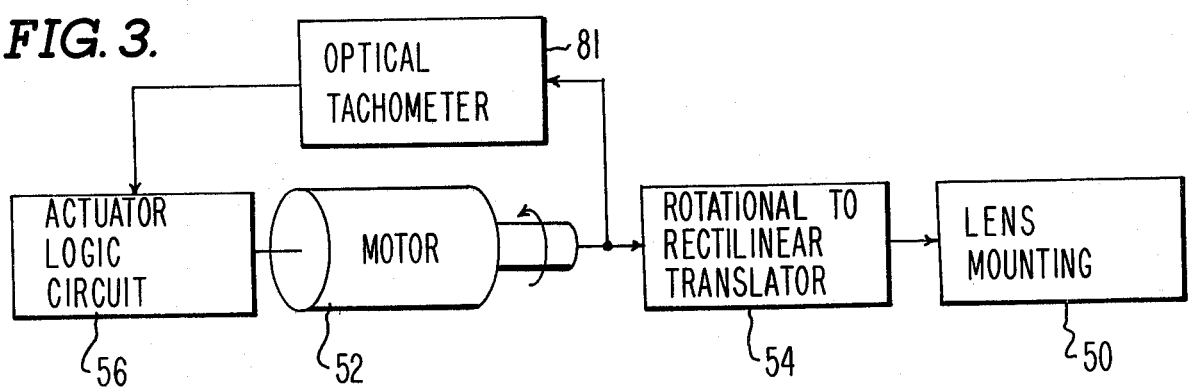
FIG. 3 is a block diagram representation of the lens actuating system of FIG. 1.

The lens actuating system 32, referred to in connection with FIG. 1, is shown in block diagram form in FIG. 3. By way of overview, the function of the lens actuating system 32 is to move the lens system 22 to track the motion of the document being photographed. The lens system 22 is caused to shuttle back and forth for each succeeding document. The motion of the lens system 22 is based on two factors: (1) the velocity of the document measured transverse to the axis of the lens system 22, and (2) the reduction ratio of the lens system. It has been determined that the relationship between the lens velocity and the document velocity should be as follows:

$$Vl = Vd \cdot (1 / (R+1))$$

where: $Vl$ = lens velocity, $Vd$ = document velocity, and $R$ = the reduction ratio of the lens system.

Viewing FIG. 3, the lens actuator system 32 includes a lens mounting 50, a source of motive power, such as a motor 52, a translator 54 for translating the rotational shaft output of the motor 52 to rectilinear motion, and an actuator logic circuit 56 which receives as input feedback from an optical tachometer 81 connected to the motor shaft.

FIG. 4 is a perspective view of a practical embodiment of the block diagram of FIG. 3, exclusive of the actuator logic circuit 56. The lens mounting is shown generally at 50. It comprises a lens housing 48; an elongate body which supports the lens system 22 centrally within it. The lens housing 48 is supported in a suspended position 48 by first and second flexural vertical support members 60 and 62 which attach to a rigid frame, generally identified at 64. The rigid frame is of substantially a reversed L-shape and is made up of a base member 66 and an upright member 68, each of which terminate at their projecting ends in flanges 70 and 72, respectively.

The first and second flexural vertical support member 60 and 62 each have one end attached to the lens housing 48 and the other end projecting in a mutually opposing direction with respect to its counterpart. The projecting ends attach to flanges 70 and 72 respectively. In the preferred embodiment the first and second flexural members 60 and 62 are of equal length and formed of strips of spring steel.

In FIG. 5, it can be seen how the lens housing 48 is displaced upon application of a motive force F to connecting link 80 in the direction of the arrow. The flexural members 60 and 62 are sufficiently resilient to allow the lens housing to be displaced through the range required to wipe the document image onto the film. It is especially advantageous to mount the lens system 22 in the configuration shown, as lateral displacement of the lens housing 48 does not cause the axis of the centrally disposed lens system 22 to rise or fall relative to its rest position. This is a significant consideration in avoiding distortion and aberration in the recorded image.

Viewing again FIG. 4, a motor 52 is provided as a source of motive power. The output shaft of the motor (not shown) is coupled to a crank 74 which rotates about shaft axis 76. The shaft has an eccentric axis 78 which provides a pivotal connection for one end of connecting link 80. The opposite end (not shown) of link 80 is coupled to the lens housing 48 within recessed portion 49.

Coupled to the shaft of the motor 52 for cooperative rotation therewith is an optical tachometer, shown generally at 81. The tachometer provides feedback information on shaft position and velocity to the actuator logic circuit 56 of FIG. 3. The tachometer comprises an encoding disk 82 and a sensing head 88.

Figure 9:
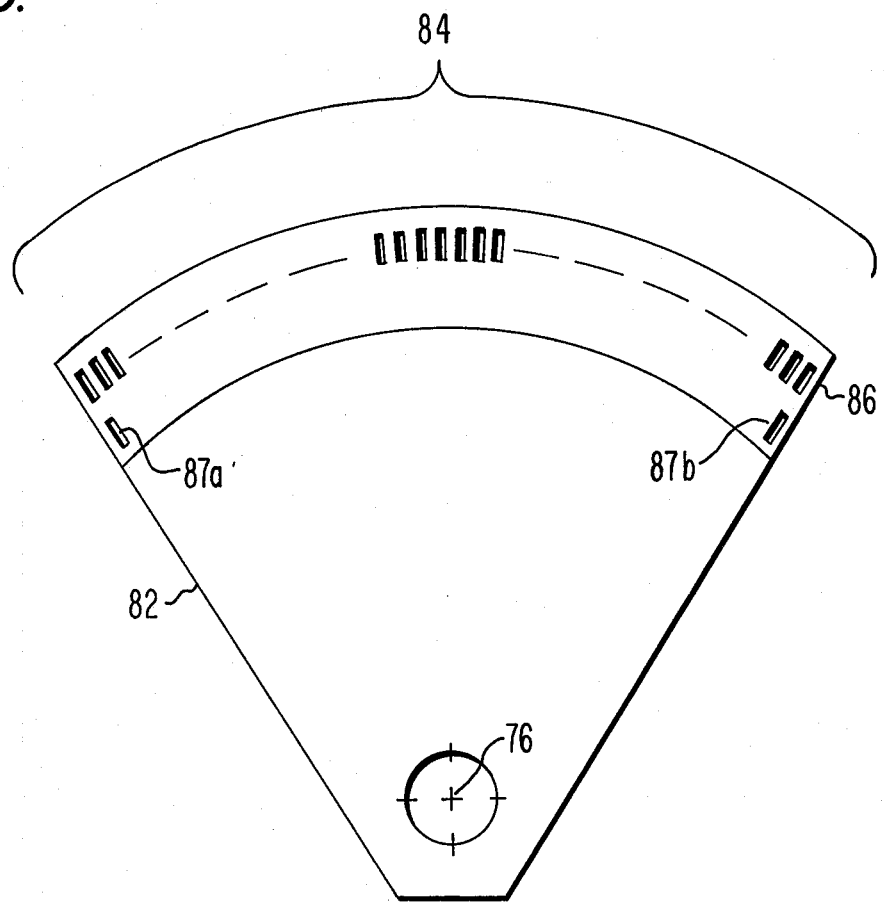
FIG. 9 is an enlarged view of the encoding disk of the optical tachometer shown in FIG. 4.

In FIG. 9 the encoding disk is shown in greater detail. It is mounted on the motor shaft for cooperative rotation about the shaft axis 76. The encoding disk 82 has at its outer periphery a timing track 86. Across the outer extreme of the timing track 86 are distributed a plurality of light apertures 84 spaced apart in a predetermined pattern. At the inward edge of the timing track 86 and at opposite lateral extremes are two light apertures 87a and b. The apertures 84 are used to detect shaft velocity, and the apertures 87a and b are used to detect extreme shaft positions.

The sensing head 88 associated with the optical tachometer 81 is shown in an enlarged, sectional view in FIG. 6, along with the encoding disk 82. The sensing head comprises a forward, depending portion 92 which houses light sources 96 and 97. The forward portion 92 is connected to main vertical shaft 90 by a cantilever section 94. Light detectors 98 and 99 are housed within the upper portion of shaft 90 in aligned relationship with light sources 96 and 97. It is apparent that when the encoding disk 82 rotates such that a light aperture, such as aperture 84a, is in alignment with source 96 and detector 98, a signal will be present on line 100. Similarly, when the encoding disk 82 reaches either of its extremes of travel and aperture 87a or b align with source 97 and detector 99, a signal will be present on line 101. The signal on line 100 provides velocity feedback and the signal on line 101 provides position feedback.

Figure 7:
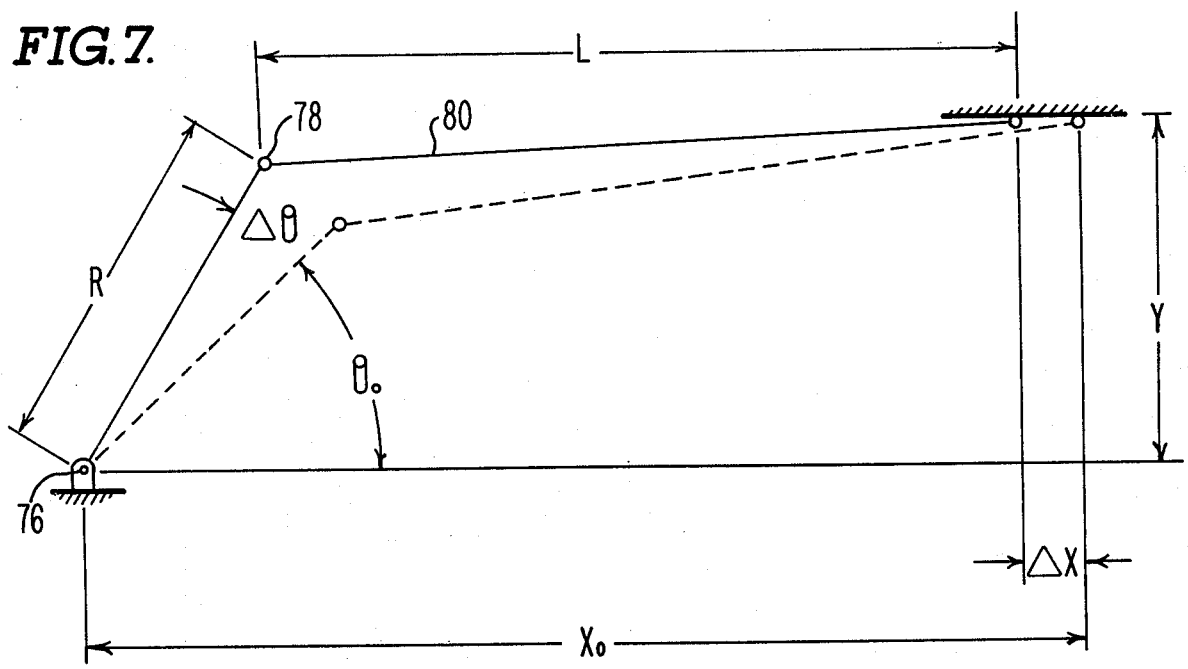
FIG. 7 is a mathematical model showing correspondence between rotational motion of the motor shaft and rectilinear motion of the lens in FIG. 4 and which is used to determine the spacing of the light apertures in the optical tachometer.

To translate the rotational motion of the motor 52 to linear motion of the lens housing 48, the array of light apertures 84 in encoding disk 82 must be spaced apart from one another in a predetermined, non-linear pattern based upon the relationship between motor output and lens housing displacement. The mathematical model of FIG. 7 is useful in this regard. In FIG. 7, fixed pivot point 78 represents the eccentric axis of crank 74, distance R represents the distance between the axes of crank 74, distance L represents the length of connecting link 80, and distance Y represents the fixed vertical position of lens housing 48. Angular measure $\theta$ and horizontal measure Xo represent initial angular and horizontal positions. Based on geometric and trigonometric analysis, the following relationship exists between $\Delta\theta$ and $\Delta X$:

$$\Delta X = Xo - R\cos(\theta o + \Delta\theta) - L(1 - ((R\sin(\theta + \Delta\theta) - Y)/L)^2)^{\frac{1}{2}}$$

This foregoing equation governs the distribution of light apertures 84 so as to correlate rotational output of the motor 52 with linear motion of the lens housing 48. The number and density of light apertures 84 is a matter of design choice dependent upon the resolution required. In a practical embodiment, 410 light apertures over a range of 60° was found satisfactory for documents traversing the image field at 60 ips.

Referring again to FIG. 3, the actuator logic circuit 56 drives the motor 52 in a controlled manner to impart linear motion to the lens mounting 50. Using the positional feedback information from the optical tachometer 81, as discussed in connection with FIG. 6, the logic circuit 56 regulates the polarity of current to the motor 52. Using the velocity feedback information from the optical tachometer, the logic circuit 56 regulates the amplitude of current to the motor.

Figure 8:
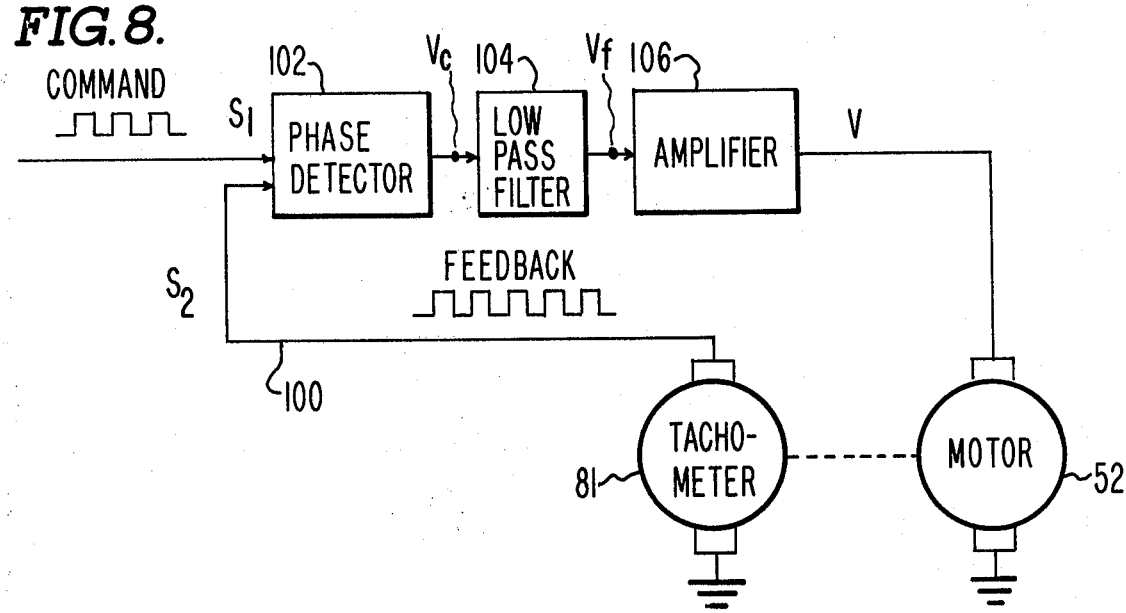
FIG. 8 is a block diagram representation of a phase-locked loop within the actuator logic circuit of FIG. 3 together with the motor and optical tachometer.

For this latter purpose, the actuator logic circuit incorporates a phase-locked servo loop, illustrated in FIG. 8 along with the motor 52 and tachometer 81. As the shaft of the motor 52 rotates, the optical tachometer 81 generates a sequence of feedback pulses S2. These pulses are fed to one input of a phase detector 102. A reference source (not shown) outputs a sequence of command pulses S1 at a frequency relating to the desired rotational velocity of the motor 52. Command pulses S1 are fed to a second input of phase detector 102. The phase detector 102 combines signals S1 and S2 and outputs a signal Vc with high frequency component and a low frequency component. The high frequency component is spurious and is filtered out by low pass filter 104. The low frequency component has an amplitude directly proportional to the phase difference between S1 and S2, and is passed through low pass filter 104 as Vf. Signal Vf is amplified by amplifier 106 and is output as a voltage V which is used to drive the motor S2. The phase-locked servo loop of FIG. 8 is effective to drive the lens mounting 50 at a highly linear rate to avoid image distortion.

The specific embodiment disclosed herein is merely representative of the broad applicability of the present invention. The foregoing description is not to be construed as limiting as widely varying embodiments will suggest themselves to those skilled in the art without departing from the scope or essence of the following claims.

The embodiments of the invention in which an exclusive property or privilege is claimed are defined as follows:

1. A photography system for photographing an object field having relative motion at a known velocity comprising:
    film means responsive to incident light energy representative of the moving object field for forming a recorded image thereof;
    lens means for receiving at a first dimension incident light energy representative of the moving object field and reducing it to a second dimension suitable for recording by said film means; and
    lens actuator means for actuating said lens means to track the moving object field at a second velocity in timed relation to said known velocity and in relation to the dimensional reduction of said lens means, said lens means moving relative to said record means during said tracking of said moving object field.

2. The photography system as defined in claim 1, further comprising image transfer means for transmitting incident light representative of the moving object field to said lens system.

3. The photography system as defined in claim 2, wherein said image transfer means includes means for transmitting both obverse and reverse surfaces of the moving object field.

4. The photography system as defined in claim 3, wherein said means for transmitting both surfaces is a mirror array.

5. The photography system as defined in claim 1, wherein said lens actuator means is defined to comprise:
    flexural mounting means for mounting said lens system,
    motive means coupled to said flexural mounting means for flexurally displacing said mounting means upon the application of motive power, and
    control means for controlling the application of motive power by said motive means in timed relation to the known velocity of the moving object field and in dimensional relation to the reduction of said lens system.

6. The photography system as defined in claim 5, wherein said flexural mounting means is defined to comprise:
    an elongate body for supporting said lens system,
    a first vertical support member formed of flexural material and having one end attached to one lateral end of said elongate body and another end projecting upwardly,
    a second vertical support member formed of flexural material and having one end attached to an other lateral end of said elongate body and another end projecting downwardly, and
    rigid frame means for attaching the upwardly projecting end of the first member and the downwardly projecting end of the second member.

7. The photography system as defined in claim 6, wherein the first and second vertical support members are formed from elongate sheets of spring steel.

8. The photography system as defined in claim 5, wherein said motive means is defined to include:
    a rotational motor having an output shaft, and
    translator means coupled to both said output shaft and said flexural mounting means for translating the rotational motion of the shaft to rectilinear motion of the flexural mounting means.

9. The photography system as defined in claim 8, wherein said translator means is defined to include:
    a crank operatively coupled to said output shaft, and
    a connecting rod having one end coupled to said crank and another end coupled to said flexural mounting means.

10. The photography system as defined in claim 8, wherein said control means is defined to include:
    a source of electrical excitation having an output signal at a reference frequency related to the velocity of the moving object field and the dimensional reduction of the lens,
    transducer means for sensing the angular velocity of said motor output shaft and outputting a signal at a frequency related thereto, and
    phase detector means responsive to output signals from said source of electrical excitation and said transducer means for outputting to said motor a signal having a magnitude related to the phase difference between the two aforementioned signals.

11. The photography system as defined in claim 10, wherein said transducer means is defined to include an optical tachometer operatively associated with said output shaft.

12. A document photography system for photographing a moving document comprising:
    document transport means for transporting the document past a viewing station;
    film means responsive to incident light energy for forming a recorded image thereof;

lens means for receiving incident light energy at a first dimension and reducing it to a second dimension suitable for recording by said film means;

image transfer means for transferring light energy representative of the portion of the obverse and reverse faces of the document present in said viewing station to said lens means; and lens actuating means for actuating said lens means to track the moving document at a second velocity in timed relation to the velocity of the moving document and in dimensional relation to the reduction of said lens means, said lens means moving relative to said record means during said tracking of said moving object field.

13. The document photography system as defined in claim 12, wherein said image transfer means comprises a mirror array.

14. The document photography system as defined in claim 12, further comprising:
film advance means associated with said film means for advancing said film means for each document to be photographed an amount dependent upon the relative width of the document.

15. The photography system as defined in claim 12, wherein said lens actuator means is defined to comprise:
flexural mounting means for mounting said lens system,
motive means coupled to said flexural mounting means for flexurally displacing said mounting means upon the application of motive power, and
control means for controlling the application of motive power by said motive means in timed relation to the known velocity of the moving object field and in dimensional relation to the reduction of said lens system.

16. The photography system as defined in claim 15, wherein said flexural mounting means is defined to comprise:
an elongate body for supporting said lens system,
a first vertical support member formed of flexural material and having one end attached to one lateral end of said elongate body and another end projecting upwardly,
a second vertical support member formed of flexural material and having one end attached to an other lateral end of said elongate body and another end projecting downwardly, and
rigid frame means for attaching the upwardly projecting end of the first member and the downwardly projecting end of the second member.

17. The photography system as defined in claim 16, wherein the first and second vertical support members are formed from elongate sheets of spring steel.

18. The photography system as defined in claim 15, wherein said motive means is defined to include:
a rotational motor having an output shaft, and
translator means coupled to both said output shaft and said flexural mounting means for translating the rotational motion of the shaft to rectilinear motion of the flexural mounting means.

19. The photography system as defined in claim 18, wherein said translator means is defined to include:
a crank operatively coupled to said output shaft, and
a connecting rod having one end coupled to said crank and another end coupled to said flexural mounting means.

20. The photography system as defined in claim 18, wherein said control means is defined to include:
a source of electrical excitation having an output signal at a reference frequency related to the velocity of the moving object field and the dimensional reduction of the lens,
transducer means for sensing the angular velocity of said motor output shaft and outputting a signal at a frequency related thereto, and
phase detector means responsive to output signals from said source of electrical excitation and said transducer means for outputting to said motor a signal having a magnitude related to the phase difference between the two aforementioned signals.

21. The photography system as defined in claim 20, wherein said transducer means is defined to include an optical tachometer operatively associated with said output shaft.

22. An image recording system for recording the image of an object field traveling at a measurable velocity comprising:
record means responsive to incident light energy representative of the moving object field for forming a recorded image thereof;
lens means for receiving at a first dimension incident light energy representative of the moving object field and reducing it to a second dimension suitable for recording by said record means; and
lens actuator means for actuating said lens means to track the moving object field at a second velocity in timed relation to said measurable velocity and in relation to the dimensional reduction of the lens means, said lens means moving relative to said record means during said tracking of said moving object field.

23. The image recording system as defined in claim 22 wherein the moving object field is defined by a document and further including image transfer means, mediate the document and lens means, for transmitting the obverse and reverse images of the document in side-by-side relationship.

24. The image recording system as defined in claim 23 wherein the record means comprises light sensitive film which records the obverse and reverse document images in side-by-side relationship with respect to its lateral dimension.

25. A method for photographically recording on film the obverse and reverse images of documents moving in a serial stream past a viewing station, comprising the steps of:
advancing the film a discrete length upon the entry of each document into the viewing station;
receiving and transmitting through a mirror array in side-by-side relationship the obverse and reverse images of a document as it passes through the viewing station;
passing the transmitted obverse and reverse images of the document through a reciprocating reduction lens which tracks the moving document in timed relation to the document's velocity and in relation to dimensional reduction of the lens; and
receiving and recording the transmitted obverse and reverse document images on said discrete length of film in side-by-side relationship with respect to the lateral dimension of the film.

* * * * *